May 15, 1956    J. F. ACHENBACH ET AL    2,745,680
IMPLEMENT HITCH WITH VERTICAL PIVOT AND SPACED
HORIZONTAL GUIDE FOR AGRICULTURAL TRACTOR
Filed Sept. 5, 1952
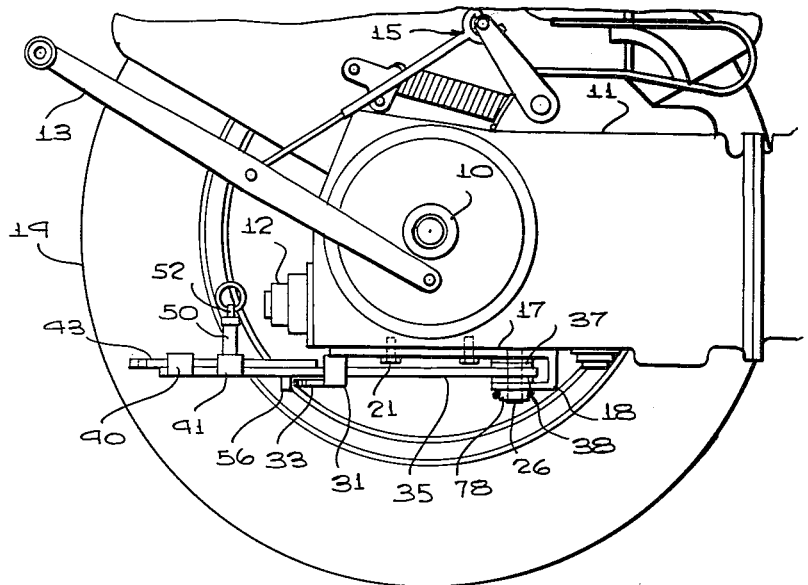
Fig. 1
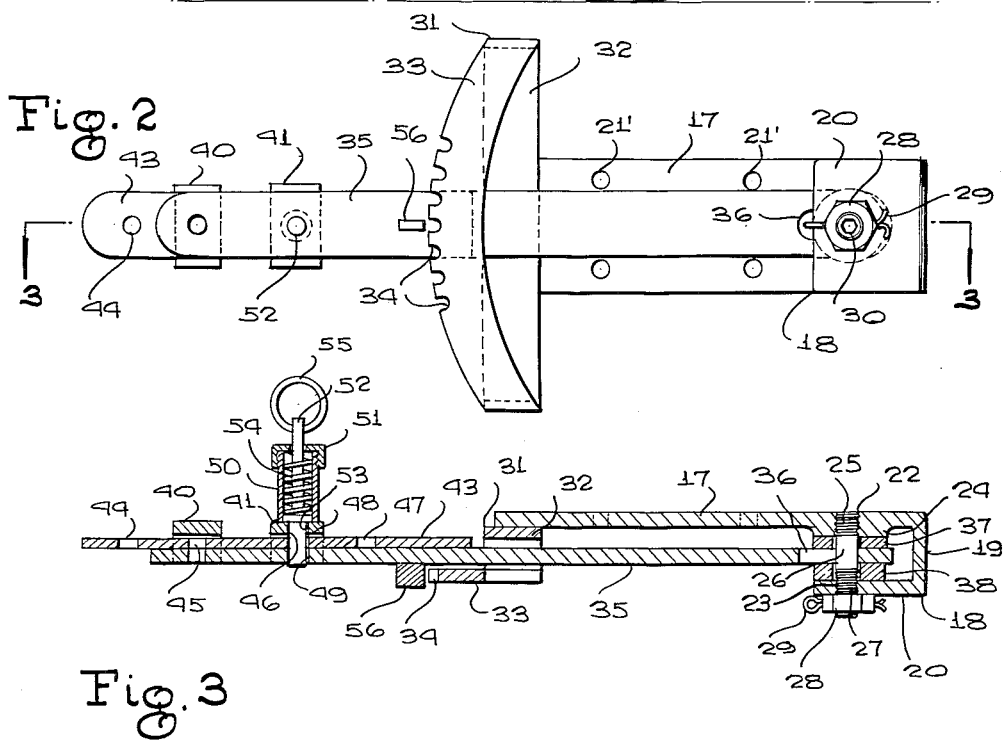
Fig. 2
Fig. 3
INVENTORS
JOHN F. ACHENBACH
& VIRGIL C. JONES
BY
McMorrow, Berman + Davidson
ATTORNEYS United States Patent Office 2,745,680
Patented May 15, 1956

2,745,680

IMPLEMENT HITCH WITH VERTICAL PIVOT AND SPACED HORIZONTAL GUIDE FOR AGRICULTURAL TRACTOR

John F. Achenbach, Taylorville, and Virgil C. Jones, Assumption, Ill.

Application September 5, 1952, Serial No. 307,962

2 Claims. (Cl. 280—499)

This invention relates to implement hitches for agricultural tractors and more particularly to an implement hitch which will provide freedom of turning movement of the tractor relative to a connected implement up to an angle of ninety degrees and will maintain the implement in line with the tractor when the tractor is operating in reverse.

It is among the objects of the invention to provide an improved implement hitch assembly which can be rigidly mounted on an existing agricultural tractor with no material modification of the tractor construction and is effective to couple an implement to the tractor in a manner such that the drag of the implement on the tractor does not interfere with turning the tractor to any desired angle to the implement up to approximately ninety degrees; which maintains the implement spaced from the tractor and against tilting or lateral dragging while the tractor is turning; which facilitates the coupling of an implement to the tractor; which positively holds the implement against swinging movements relative to the tractor while the tractor is operating in reverse; and which is simple and durable in construction, economical to manufacture, easy to install, and positive and effective in operation.

Other objects and advantages will become apparent from a consideration of the following description and the appended claims in conjunction with the accompanying drawing, wherein:

Figure 1 is a fragmentary side elevational view of the rear portion of an agricultural tractor with one of the rear wheels removed and with an implement hitch assembly illustrative of the invention operatively mounted on the tractor;

Figure 2 is a bottom plan view of the implement hitch illustrated in Figure 1; and Figure 3 is a longitudinal cross sectional view on the line 3—3 of Figure 2.

With continued reference to the drawing, the tractor fragmentarily illustrated is a tractor having a rear axle 10, a drive mechanism housing 11 constituting a part of the rear axle structure and extending forwardly and rearwardly of the rear axle substantially perpendicular to the latter at the midlength location thereof. This housing includes the usual change speed transmission and differential mechanism of the tractor and has a flat bottom side of somewhat elongated, rectangular shape. A power take-off connection 12 is provided at the rear end of the housing 11 and tension links, as indicated at 13, connected each at one end to the rear axle housing and extending rearwardly of the rear axle constitute the usual means for connecting an implement to the tractor. The rear axle of the tractor is supported on the rear drive wheels, as indicated at 14, and the tension links are connected to a tractor-carried lift mechanism, generally indicated at 15 and well known to the art, for controlling the operating depth of an implement towed by the tractor.

In many cases it is desirable to dispense with the depth regulating hitch provided by the tension links 13 and connect an implement or vehicle to the tractor by a direct pull hitch connection, this being particularly true when the tractor is used to pull an implement such as a disc harrow, a roller type soil conditioner or a trailer wagon. When such implements are pulled by means of the lift-operated hitch means provided on this type of tractor, the tractor cannot be turned at a sharp angle relative to the implement or vehicle because the drag of the implement on the hitch will cause the front wheels of the tractor to slide over and make a turn of much greater radius than the tractor is capable of making when not connected to an implement. Also, this type of hitch causes the implement to tilt or roll when the tractor makes too short a turn and pulls the implement up against the adjacent rear wheel of the tractor. The hitch assembly of the present invention will, as explained above, permit the tractor to make a sharp turn, up to ninety degrees, relative to the connected implement without causing the implement to tip or roll or to move against a rear wheel of the tractor.

The implement hitch comprises a mounting plate 17 of elongated, rectangular shape having at one end a transversely extending, channel shaped formation 18 which includes an intermediate portion 19 extending perpendicularly from the corresponding end of the mounting plate and a flange 20 extending perpendicularly from the end of the intermediate portion 19 remote from the plate 17 and disposed in spaced and substantially parallel relationship to the plate. This plate is provided adjacent its side edges with spaced apart apertures and is disposed against the underside of the tractor housing 11 with the channel shaped formation 18 depending from the bottom of the housing with its open side facing rearwardly toward the other end of the plate.

The mounting plate is secured to the housing 11 by spaced apart stud bolts, as indicated at 21, extending one through each of the apertures 21' in the mounting plate and threaded into tapped holes provided in the housing 11 and opening to the bottom surface of the housing.

The channel shaped formation 18 is provided with king pin holes 22 and 23 of which the hole 22 is provided in the plate 17 adjacent the intermediate portion 19 of the channel shaped formation and extends through a thickened portion or boss 24 on the underside of the plate and the hole 23 is provided in the flange 20 of the channel shaped formation and is in vertical alignment with the hole 22 when the mounting plate 17 is horizontally disposed. The hole 22 is internally screw threaded to receive an externally screw threaded end portion 25 of a king pin 26 the other end of which is also externally screw threaded, as indicated at 27, and extends through the hole 23 in the flange 20. The one end of the king pin is threaded into the hole 22 and a lock nut 28 is threaded onto the other end of the king pin below the flange 20 to lock the king pin in position in the channel shaped formation 18 of the mounting plate, the lock nut being held in position on the king pin by a cotter key 29 extending through transverse holes in the nut and the king pin. Preferably a wrench socket 30 is provided in the end of the king pin 26 which receives the nut 28 so that the king pin can be removed from the channel shaped formation 18 of the mounting plate after the lock nut 28 has been loosened.

A guide frame 31 is mounted on and disposed below the mounting plate 17 at the end of the mounting plate remote from the channel shaped formation 18 and this guide frame includes spaced apart and substantially parallel guide bars 32 and 33 of which the guide bar 32 is straight and is secured directly to the mounting plate so that its longitudinal center line is disposed perpendicular to the longitudinal center line of the plate 17 and the bar extends to substantially equal distances at the opposite sides of the plate. The bar 33 is disposed below the bar 32 and is longitudinally curved on at least its edge remote from the channel shaped formation 18 along an arc centered on the axis of the king pin holes 22 and 23 in the channel shaped formation. This bar is provided in its outer, curved edge with a series of spaced apart notches 34 for a purpose which will presently appear.

An elongated, flat draw bar 35 is disposed intermediate its length between the guide bars 32 and 33 of the guide frame and has one end portion disposed within the channel shaped formation 18 and provided with an aperture 36 which is elongated longitudinally of the draw bar 35 and through which the king pin 26 extends, as illustrated in Figure 3. As the thickness of the draw bar 35 will normally be less than the distance between the underside of the plate 17 and the adjacent side of the flange portion 20 of the channel shaped formation, spacing washers 37 and 38 surround the king pin respectively above and below the draw bar 35 and fill the spaces between the draw bar and the adjacent sides of the plate 17 and the flange 20.

Guide sleeves 40 and 41 of elongated, rectangular cross sectional shape are mounted on the draw bar 35 and extend over the upper side of the draw bar with the sleeve 40 disposed adjacent the end of the draw bar remote from the channel shaped formation 18 and the guide sleeve 41 spaced from the sleeve 40 and disposed between the sleeve 40 and the guide frame 31.

The axis of the king pin 26 is located a considerable distance ahead of and below the drive axis of the rear axle of the tractor so that any pull on the draw bar will have a tendency to hold the front wheels of the tractor down and prevent rearing of the tractor and the draw bar extends to a considerable distance rearwardly of the tractor rear axle so that the tongue of an implement or vehicle connected to the tractor will be clear of the tractor drive wheel when the tractor is disposed at an angle of approximately ninety degrees to the implement or vehicle.

An elongated, flat hitch bar 43 is slidably received in the guide sleeves 40 and 41 for movement longitudinally of the draw bar 35 and normally extends rearwardly beyond the rear end of the draw bar. This hitch bar is provided near its end remote from the mounting plate 17 with an aperture 44 for attaching it to an implement tongue by a suitable connector, such as a clevis, and is provided with apertures 45, 46 and 47 spaced apart longitudinally thereof between the aperture 44 and the front end of the hitch bar adjacent the mounting plate 17. The sleeve 41 is provided with an aperture 48 in the portion thereof extending over the draw bar 35 and the draw bar 35 is provided with an aperture 49 in alignment with the aperture 48. A spring cylinder 50 is mounted on and extends perpendicularly from the outer side of the guide sleeve 41 concentrically of the aperture 48 and is provided with a centrally apertured, screw cap 51 at its end remote from the guide sleeve. A coupling pin 52 extends through the aperture in the cap 51 and through the apertures 48, 46 and 49 in the guide sleeve 41, the hitch bar 43 and the draw bar 35. This pin 52 is provided with an annular shoulder 53 at the outer side of the guide sleeve 41 and a compression spring 54 is disposed within the cylinder 50 between the shoulder 53 and the cap 51 to resiliently urge the pin in a direction to extend through the registering apertures in the guide sleeve, the hitch bar and the draw bar. A pull ring 55 is secured to the pin at the end of the pin adjacent the cap 51 for pulling the pin out of the apertures against force of spring 54.

In connecting the hitch to an implement, the coupling pin 52 may be pulled out of the apertures in the draw bar and the hitch bar and the hitch bar moved rearwardly until it can be connected to an implement disposed at the rear of the associated tractor, it being necessary to exercise care only to the extent that the hitch bar is not pulled entirely out of the guide sleeves 40 and 41. The coupling pin may then be released and the tractor moved a sufficient distance in reverse to slide the hitch bar forwardly along the draw bar until an aperture in the hitch bar registers with the aperture 49 in the draw bar at which time the pin will drop through the registering apertures and couple the hitch bar to the draw bar. If the aperture 47 first registers with the aperture 49 and it is desired to use the aperture 46 in the hitch bar to provide a shorter coupling, the pin may be pulled out again and the tractor backed up a further distance, the pin being released during the backward movement of the tractor so that it will drop through the aperture 46 when this aperture comes into registry with the aperture 49 in the draw bar.

When the tractor is backed up the draw bar 35 will move forwardly relative to the tractor a slight distance because of the elongation of the king pin receiving aperture 36 in the draw bar. A lug 56 projects from the underside of the draw bar 35 just to the rear of the curved rear edge of the guide bar 33 and, when the tractor is reversed, this lug will move into the adjacent notch 34 and lock the draw bar and hitch bar against swinging movement about the king pin 26 relative to the tractor while the tractor is being backed up. This renders it possible to back up an implement or vehicle with the tractor without having the implement or vehicle jackknife to a position along side the tractor during such backing up operation.

The invention may be embodied in other specific forms without departing from the spirit or essential characteristics thereof. The present embodiment is, therefore, to be considered in all respect as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an agricultural tractor having a rear axle and a drive mechanism housing disposed at right angles to said rear axle midway between the ends of the latter, an implement hitch assembly comprising a flat mounting plate having at one end a transversely extending channel formation including an intermediate portion extending perpendicularly from said one end and a flange extending perpendicularly from the end of the intermediate portion remote from the plate and disposed in spaced and substantially parallel relationship to the plate positioned so that the plate bears against the under side of said housing with the intermediate portion and flange of the channel formation depending from the under side of the housing and having the open side facing rearwardly toward the other end of the plate, means securing said plate to the under side of said housing, there being a hole in said flange and registering with a hole formed in the adjacent portion of said plate, a king pin extending through the registering holes and removably supported in said holes, a guide frame carried by the other end of said plate and extending transversely of and to respectively opposite sides of said plate therebeneath, said guide frame including a pair of guide bars arranged in superimposed spaced relation, a drawbar positioned longitudinally of and below said plate and projecting between said guide bars and having one end extending between said flange and the adjacent portion of said plate, said one end of said drawbar having an aperture through which said king pin extends, a hitch bar slidably carried on said drawbar for movement longitudinally of said drawbar, and means carried by said drawbar for operative engagement with said hitch bar to maintain said hitch bar in a selected position longitudinally of said drawbar.

2. In an agricultural tractor having a rear axle and a drive mechanism housing disposed at right angles to said rear axle midway between the ends of the latter, an implement hitch assembly comprising a flat mounting